US006798483B2

United States Patent
Lee et al.

(10) Patent No.: US 6,798,483 B2
(45) Date of Patent: Sep. 28, 2004

(54) FLOATING ELECTRODE SWITCHING LIQUID CRYSTAL DISPLAY

(75) Inventors: Seok Lyul Lee, Taoyuan Hsien (TW); Han Jun Park, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 0 days.

(21) Appl. No.: 10/132,777

(22) Filed: Apr. 25, 2002

(65) Prior Publication Data

US 2003/0202130 A1 Oct. 30, 2003

(51) Int. Cl.[7] ............................................. G02F 1/1343
(52) U.S. Cl. ........................................................ 349/141
(58) Field of Search ......................................... 349/141

(56) References Cited

U.S. PATENT DOCUMENTS 6,356,331 B1 * 3/2002 Ono et al. ................... 349/141
6,466,288 B1 * 10/2002 Rho ............................ 349/141
6,570,638 B2 * 5/2003 Song .......................... 349/143
2002/0159016 A1 * 10/2002 Nishida et al. ............. 349/141

* cited by examiner

*Primary Examiner*—Robert H. Kim
*Assistant Examiner*—Jeanne Andrea Di Grazio
(74) *Attorney, Agent, or Firm*—Merchant & Gould P.C.

(57) ABSTRACT

A floating electrode switching liquid crystal display (FES-LCD). A plurality of liquid crystal molecules held between the first substrate and the second substrate, and the liquid crystal molecules are aligned to a first direction. A plurality of transverse-extending gate lines and lengthwise-extending signal lines formed on the first substrate to define a plurality of pixel areas arranging in a matrix form. A plurality of pixel electrodes and floating electrodes formed on the first substrate, the pixel electrodes and the floating electrodes are positioned within the pixel areas, and being arranged to a second direction. A common electrode layer formed on the second substrate. The pixel electrodes and the floating electrodes are separated in the same plane, and the first direction and the second direction are intersected with an angle θ.

12 Claims, 5 Drawing Sheets

FLOATING ELECTRODE SWITCHING LIQUID CRYSTAL DISPLAY

BACKGROUND OF THE INVENTION

1. Field of the Invention

The present invention relates in general to a liquid crystal display (LCD). In particular, the present invention relates to a floating electrode switching liquid crystal display (FES-LCD).

2. Description of the Related Art

In-Plane Switching mode liquid crystal display (IPS-LCD) has been used or suggested in wide view angle display technology to improve a conventional twisted nematic liquid crystal display (TN-LCD). FIG. 1 is a sectional view showing a conventional IPS-LCD. Liquid crystal molecules 160 are held between a color filter substrate 180 and a TFT (Thin Film Transistor) substrate 100. Two common electrodes 120 are formed on the TFT substrate 100, and an insulator layer 130 is deposited to cover the common electrodes 120 and the array substrate 100. A pixel electrode 140 is positioned on the insulator layer 130 between the two common electrodes 120, and a passivation layer 150 is covered over the pixel electrode 140 and the insulator layer 130. An over coat layer 170 is formed on one side of the color filter substrate 180, and the back ITO (Indium tin oxide) layer 190 is deposited on the other side of the color filter substrate 180. When applying voltages to the common electrodes 120 and the pixel electrode 140, in-plane electric fields E are generated to drive the liquid crystal molecules 160 rotating along the electric field. Therefore, the IPS-LCD can improve viewing angle, contrast ratio and luminescent efficiency. However, this conventional IPS-LCD still has following problems: low transmittance, image sticking problem and high cost color filter.

SUMMARY OF THE INVENTION

The object of the present invention is to provide a floating electrode switching liquid crystal display (FES-LCD) to solve the problems caused by above conventional IPS-LCD.

This floating electrode switching liquid crystal display (FES-LCD) includes: a first substrate and a second substrate. A plurality of liquid crystal molecules held between the first substrate and the second substrate, the liquid crystal molecules are aligned to a first direction. A plurality of transverse-extending gate lines and lengthwise-extending signal lines formed on the first substrate to define a plurality of pixel areas being arranged in a matrix form. A plurality of pixel electrodes and floating electrodes formed on the first substrate, the pixel electrodes and the floating electrodes are positioned within the pixel areas, wherein the floating electrodes are positioned within each one of the pixel electrodes, the floating electrodes being arranged to a second direction and a third direction other than the second direction, the floating electrode are strip-shared, at least two adjacent floating electrodes are not parallel, the floating electrodes are spaced apart and arranged along the first direction, and for each pixel area, one line extends along a direction perpendicular to the first direction across only one floating electrode. A plurality of switching elements formed on the first substrate and within the pixel areas, each pixel area has at least one switching element, and the switching elements are connected to the pixel electrodes. A common electrode layer formed on the second substrate. Wherein, the pixel electrodes and the floating electrodes are separated in the same plane, and the first direction and the second direction or the third direction are intersected with an angle θ.

According to this FES-LCD of the present invention, the transmittance is increased and the image sticking is improved. Moreover, because the FES-LCD can be fabricated using normal TN manufacturing method, the process of the FES-LCD is simplified. Further, because the color filter of the FES-LCD can uses normal color without back ITO and over coat layers, the cost of color filter is successfully decreased.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Figure 1:
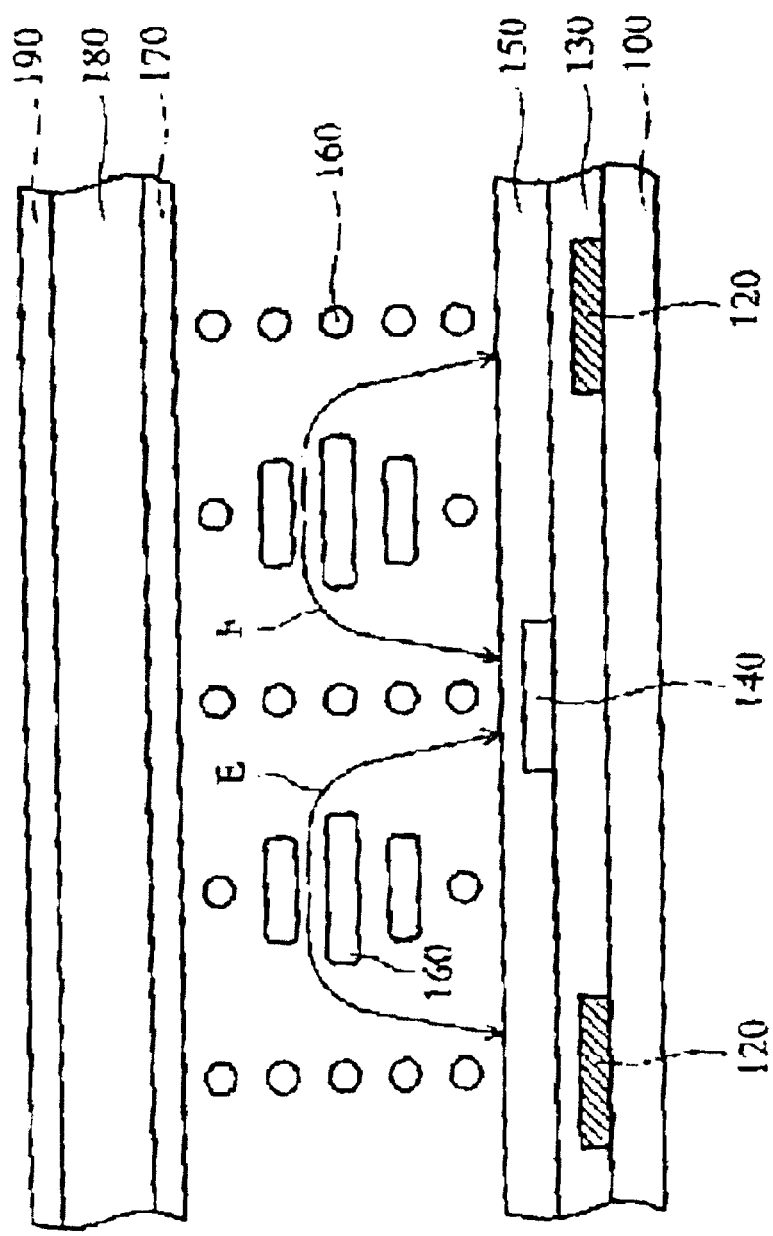
FIG. 1 is a sectional view showing a conventional IPS-LCD.
Figure 2:
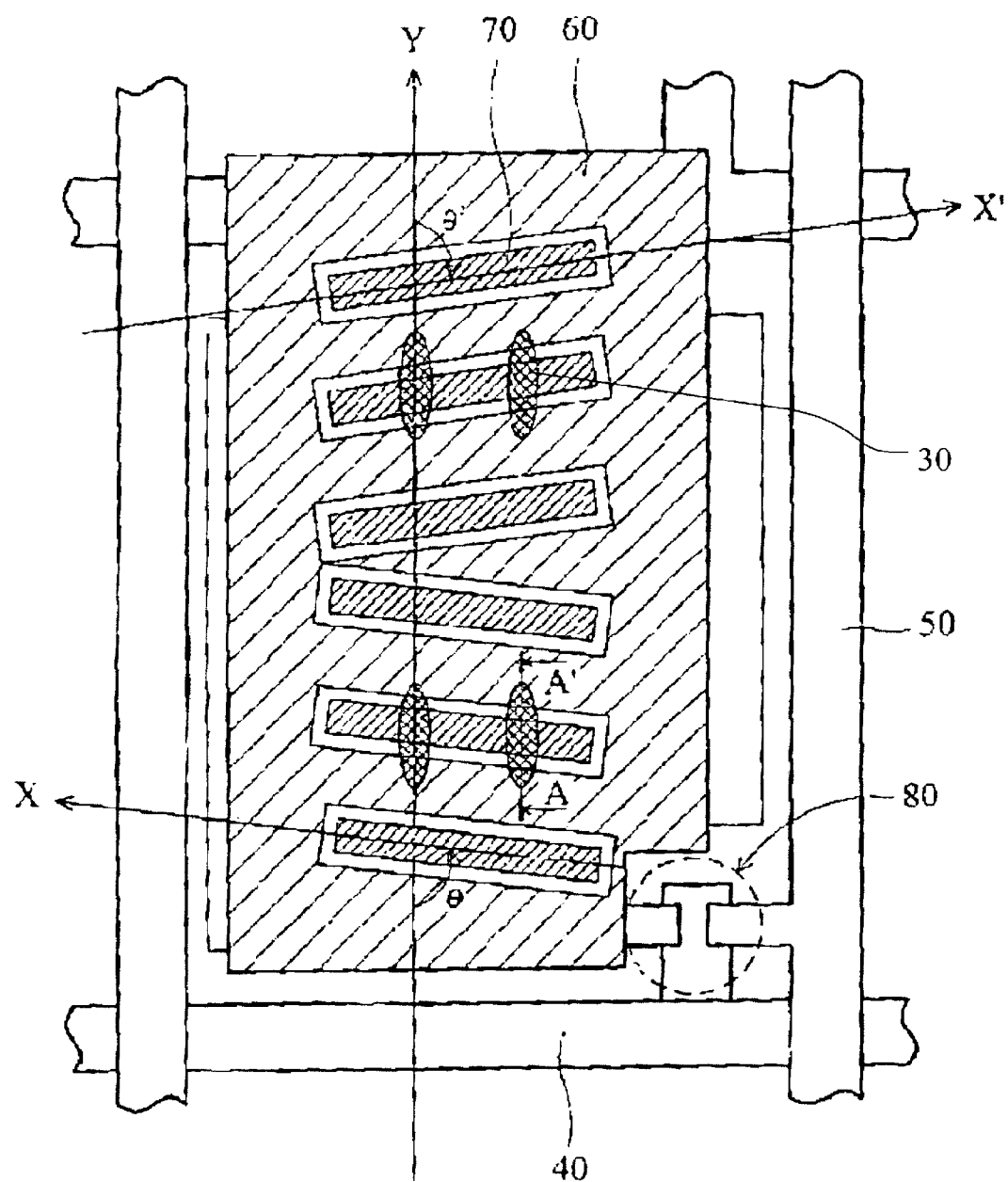
FIG. 2 is a top view showing an electrode array of the FES-LCD.

FIG. 2 is a top view showing an electrode array of the FES-LCD. First, a plurality of transverse-extending gate lines 40 and lengthwise-extending signal lines 50 are formed on the first substrate (not shown) to define a plurality of pixel areas being arranged in a matrix form. TFT 80 are also defined in the meanwhile. The gate lines 50, preferably, are composed of non-transparent conductivity film.

Moreover, a plurality of pixel electrodes 60 and a plurality of floating electrodes 70 are formed on the first substrate (not shown) at the same time. The pixel electrodes 60 and the floating electrodes 70 are positioned within the pixel areas, wherein the floating electrodes are positioned within each one of the pixel electrodes, and the floating electrodes are arranged to a predetermined direction X or X'. Otherwise, the pixel electrodes 60 and the floating electrodes 70 are separated in the same plane. In this case, the pixel electrodes 60 and the floating electrodes 70, preferably, are composed of transparent conductivity film.

A plurality of liquid crystal molecules 30 are held between the first substrate (not shown) and the second substrate (not shown), and the liquid crystal molecules 30 are aligned to a predetermined rubbing direction Y. In this case, the liquid crystal molecule 30 is a negative dielectric anisotropy material. As shown in FIG. 2, the direction X and the rubbing direction Y are intersected with an angle θ. Otherwise, the direction X' and the rubbing direction Y are intersected with an angle θ'. The angle θ is about 70~85°, and the angle θ' is about −70~−85°.

Figure 3:
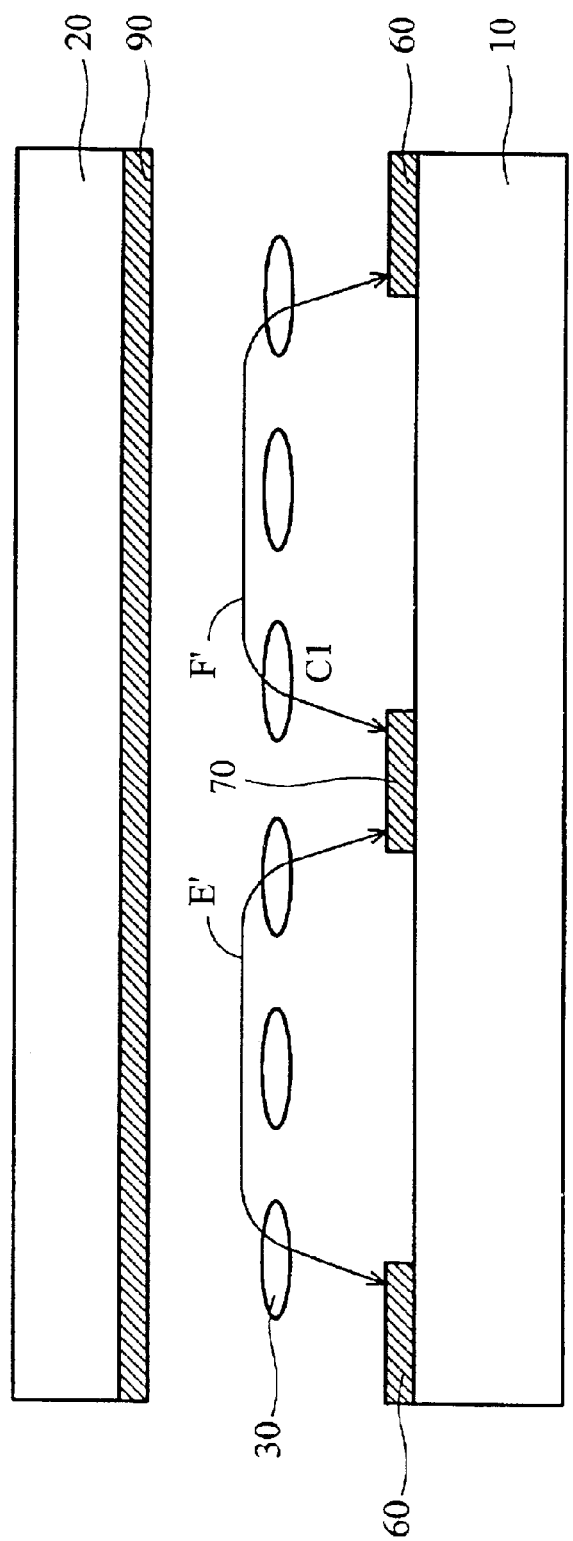
FIG. 3 is a sectional view showing the structure along to line A–A' of FIG. 2.
Figure 4:
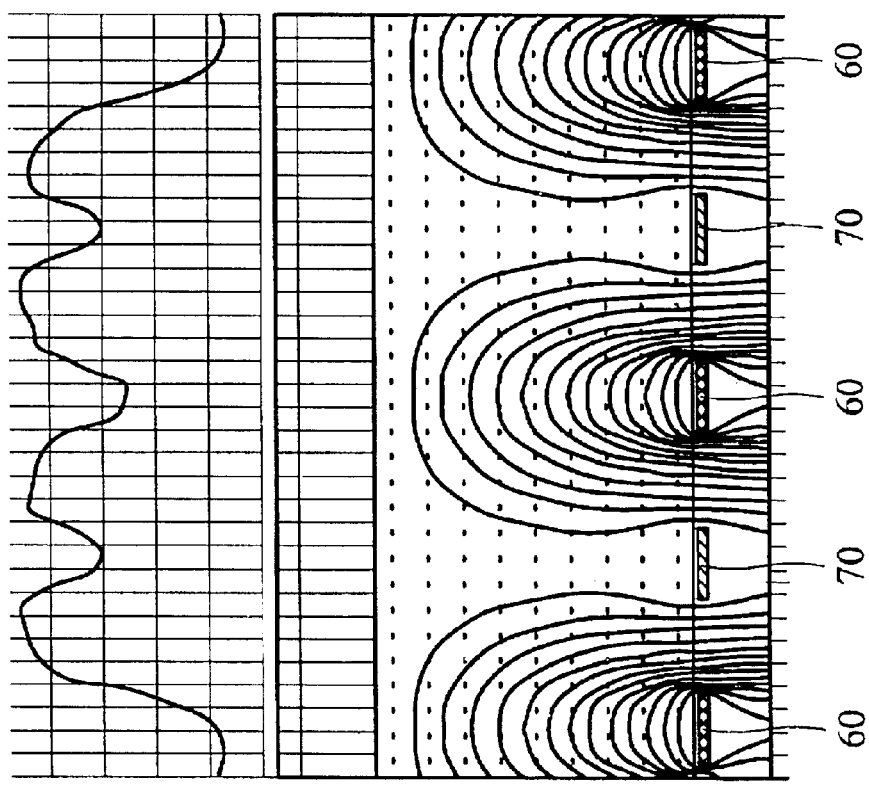
FIG. 4 is a diagram showing transmittance of the FES-LCD according to the present invention.
Figure 5:
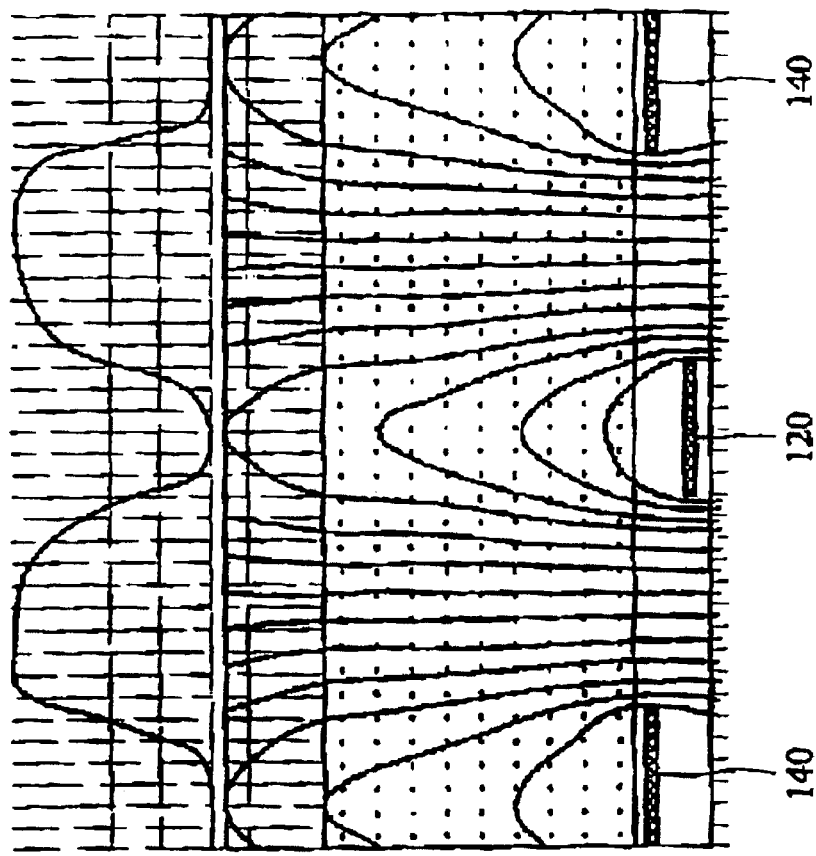
FIG. 5 is a diagram showing transmittance of a conventional IPS-LCD.

FIG. 3 is a sectional view showing the structure along to line A–A' of FIG. 2. Refer to FIG. 3, the pixel electrodes 60 and the floating electrodes 70 are separated and being formed in the same plane on an TFT substrate (above first substrate) A common electrode layer 90 is formed on a color filter substrate 20 (above second substrate). When a voltage is applied to the common electrode layer 90, the floating electrodes 70 are induced to generate assistant electric fields E'. These assistant electric fields E' can help to rotate liquid crystal molecules 30 above the pixel electrodes 60 and the floating electrodes 70. FIG. 4 showing transmittance of the FES-LCD according to the present invention, it is apparent that the transmittance is significantly improved as compared to that of FIG. 5, which shows transmittance of a conventional IPS-LCD.

Therefore, a high transmittance (about 80%) is obtained, and the image sticking problem is improved.

Furthermore, according to the FES-LCD of the present invention, a normal color filter substrate without back ITO and over coat layers can be used in FES-LCD fabricating process. Therefore, the fabricating process of FES-LCD is simplified, and the cost of color filter is also successfully decreased.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A floating electrode switching liquid crystal display (FES-LCD), comprising:

a first substrate and a second substrate;

a plurality of liquid crystal molecules held between the first substrate and the second substrate, the liquid crystal molecules are aligned to a first direction;

a plurality of transverse-extending gate lines and lengthwise-extending signal lines formed on the first substrate to define a plurality of pixel areas being arranged in a matrix form;

a plurality of pixel electrodes and a plurality of floating electrodes formed on the first substrate, the pixel electrodes and the floating electrodes are positioned within the pixel areas, wherein the floating electrodes are positioned within each one of the pixel electrodes, the floating electrodes are strip-shaped, at least two adjacent floating electrodes are not parallel and the floating electrodes are spaced apart and arranged along the first direction, and for each pixel area, one line extends along a direction perpendicular to the first direction across only one floating electrode;

a plurality of switching elements formed on the first substrate and within the pixel areas, each pixel area has at least one switching element, and the switching elements are connected to the pixel electrodes; and a common electrode layer formed on the second substrate; wherein:

the pixel electrodes and the floating electrodes are separated in the same plane.

2. The floating electrode switching liquid crystal display as claimed in claim 1, wherein the first substrate is an TFT substrate.

3. The floating electrode switching liquid crystal display as claimed in claim 1, wherein the second substrate is a color filter substrate.

4. The floating electrode switching liquid crystal display as claimed in claim 1, wherein the liquid crystal molecule is a negative dielectric anisotropy material.

5. The floating electrode switching liquid crystal display as claimed in claim 1, wherein the first direction is rubbing direction.

6. The floating electrode switching liquid crystal display as claimed in claim 1, wherein the gate lines are composed of non-transparent conductivity film.

7. The floating electrode switching liquid crystal display as claimed in claim 1, wherein the pixel electrodes and the floating electrodes are composed of transparent conductivity film.

8. The floating electrode switching liquid crystal display as claimed in claim 1, wherein the switching elements are thin film transistors.

9. The floating electrode switching liquid crystal display as claimed in claim 1, wherein the FES-LCD is an active matrix LCD.

10. The floating electrode switching liquid crystal display as claimed in claim 1, wherein the floating electrodes are arranged to a second direction and a third direction other than the second direction, and the first direction and the second direction or the third direction are intersected with an angle $\theta$.

11. The floating electrode switching liquid crystal display as claimed in claim 10, wherein the angle $\theta$ is about 70~85°.

12. The floating electrode switching liquid crystal display as claimed in claim 10, wherein the angle $\theta$ is about −70~−85°.

* * * * *